(12) United States Patent
Tsuji

(10) Patent No.: US 7,118,395 B2
(45) Date of Patent: Oct. 10, 2006

(54) CARD CONNECTOR LOCKING MEMBER ARRANGEMENT

(75) Inventor: Junya Tsuji, Tokyo (JP)

(73) Assignee: Tyco Electronics AMP K.K., Kanagawa-ken (JP)

(*) Notice: Subject to any disclaimer, the term of this patent is extended or adjusted under 35 U.S.C. 154(b) by 0 days.

(21) Appl. No.: 11/148,857

(22) Filed: Jun. 9, 2005

(65) Prior Publication Data
US 2005/0277318 A1    Dec. 15, 2005

(30) Foreign Application Priority Data
Jun. 9, 2004    (JP)    ............... 2004-171394

(51) Int. Cl.
H01R 13/62    (2006.01)
(52) U.S. Cl. ...................... 439/159; 439/630
(58) Field of Classification Search ................ 439/159, 439/630
See application file for complete search history.

(56) References Cited

U.S. PATENT DOCUMENTS 6,641,413 B1* 11/2003 Kuroda ....................... 439/159
6,729,892 B1* 5/2004 Takada et al. ............... 439/159
6,814,596 B1* 11/2004 Yu et al. ...................... 439/159

FOREIGN PATENT DOCUMENTS

JP    2000-251025    9/2000
JP    2002-270299    9/2002

* cited by examiner

Primary Examiner—Hae Moon Hyeon
(74) Attorney, Agent, or Firm—Barley Snyder LLC

(57) ABSTRACT

A card connector comprises a housing with a slider. The slider is moveable between a first position where a card has been inserted into the housing and a final position where the card is ejected from the housing. The slider includes a spring that drives the slider in a direction of card ejection. A cam mechanism secures the slider in the first position and the final position. The cam mechanism includes a substantially heart-shaped cam groove and a cam rod. The cam rod has a support shaft fixed to the housing and a cam engagement member positioned in the cam groove. A locking member having a substantially cantilever construction locks the card in the housing and has a fixed end attached to the slider and a free end that is positioned substantially above the cam groove. The free end is moveable across the cam groove.

19 Claims, 14 Drawing Sheets

CARD CONNECTOR LOCKING MEMBER ARRANGEMENT

FIELD OF THE INVENTION

The invention relates to a card connector and, more particularly, to a card connector having a reduced depth that comprises a cam mechanism and a locking member.

BACKGROUND OF THE INVENTION

In recent years, electronic devices requiring a user to insert a card, such as a memory card, into a card connector connected to the electronic device have become increasingly more popular. Examples of these types of electronic devices include cameras, personal computers, and portable telephones. Data is either recorded on the card from the electronic device or data is supplied from the card to the electronic device.

FIG. 13 shows an example of a conventional card connector 101 of this type (see JP2000-251025A). As shown in FIG. 13, the card connector 101 comprises a housing 110 that receives a card (not shown). The housing 101 includes a plurality of contact receiving grooves 111. A slider 120 is disposed on one side of the housing 110. The slider 120 is driven by a compression coil spring 121 that enables the slider 120 to eject the card (not shown) from the housing 110. The spring 121 has a rear-end portion fitted over a spring receiving projection 113 provided on a rear wall of the housing 110. A front-end portion of the spring 121 abuts against a rear-end surface of the slider 120.

The housing 110 further has a cam mechanism 130, which causes the slider 120 to stop in a first position and in a third or final position along a direction of card ejection. The cam mechanism 130 is constructed as a heart-shaped cam groove 112 and is formed in a vicinity of a card insertion opening of the housing 110. A cam rod 122 is shaft-supported by the slider 120 and follows the cam groove 112.

When the slider 120 is in the first position, the card insertion has been completed, and the card (not shown) is in contact with contacts (not shown) arranged in the contact receiving grooves 111. When the card (not shown) is pushed further into the housing 110, the slider 120 is driven in the direction of card ejection by the spring 121. The slider 120 is caused to stop in the third position by the cam mechanism 130, and the card (not shown) is ejected.

Although the card connector 101 has a reduced width and height, since the cam groove 112 is formed in a vicinity of the card insertion opening in the housing 110, it is difficult to reduce the depth (direction of card insertion and ejection) of the card connector 101. Additionally, the card connector 101 is not formed with a locking member. Thus, the card (not shown) can not be locked in the housing 110 when it is completely inserted or prevented from slipping-out of the housing 110 when it is ejected.

FIGS. 14A–14B show an example of another conventional card connector 201 (see JP2002-270299A). The card connector 201 comprises a housing 210 that receives a card (not shown). The housing 210 includes a plurality of contact receiving grooves 211. A slider 220 is disposed on one side of the housing 210. The slider 220 is driven by a compression coil spring 214 that enables the slider 220 to eject the card (not shown) from the housing 210. A rear-end portion of the spring 214 is fitted over a spring receiving projection 213 provided on a rear wall of the housing 210. A front-end portion of the spring 214 contacts a wall surface 223 of the slider 220.

A cam mechanism causes the slider 220 to stop in a first position and a third or final position along a direction of card ejection. The cam mechanism is constructed in the form of a heart-shaped cam groove 212 and is formed in a vicinity of a card insertion opening in the housing 210. A cam rod 221 is shaft-supported by the slider 220 and follows the cam groove 212. A locking member 222 is attached to the slider 220 and locks the card (not shown).

In the card connector 201, when the slider 220 is in the first position, the insertion of the card (not shown) has been completed. In this state, the card (not shown) is locked by the locking member 222. During ejection of the card (not shown), the elastic properties of the locking member 222 temporarily hold the card (not shown), so that the card (not shown) is prevented from inadvertently slipping-out of the housing 210.

Because the card connector 201 includes the locking member 222, the card (not shown) can be locked in the housing 210 when it is completely inserted and prevented from slipping-out of the housing 210 when it is ejected. However, although the card connector 201 has a reduced width and height, since the cam groove 212 is formed in a vicinity of the card insertion opening in the housing 210, it is still difficult to reduce the depth (direction of card insertion and ejection) of the card connector 201.

It is therefore desirable to develop a card connector that has a reduced width, height, and depth that can be used, for example, in compact electronic devices, such as portable telephones.

SUMMARY OF THE INVENTION

It is an object of the invention to provide a compact card connector with a reduced width, height, and depth.

This and other objects are achieved by a card connector that comprises a housing that receives a card. A slider is arranged in the housing. The slider is moveable between a first position where a card has been inserted into the housing and a final position where the card is ejected from the housing. The slider includes a spring that drives the slider in a direction of card ejection. A cam mechanism secures the slider in the first position and the final position. The cam mechanism includes a substantially heart-shaped cam groove and a cam rod. The cam rod has a support shaft fixed to the housing and a cam engagement member positioned in the cam groove. A locking member having a substantially cantilever construction locks the card in the housing and has a fixed end attached to the slider and a free end that is positioned substantially above the cam groove. The free end is moveable across the cam groove.

This and other objects are further achieved by a card connector comprising a housing that receives a card. A slider is arranged in the housing. The slider is moveable between a first position where the card has been inserted into the housing and a final position where the card is ejected from the housing. The slider has a substantially heart-shaped cam groove. A spring is attached to the slider and drives the slider in a direction of card ejection. A locking member locks the card in the housing. The locking member is of a substantially cantilever construction and has a fixed end attached to the slider and a free end that is positioned substantially above the cam groove. The free end is moveable across the cam groove.

DETAILED DESCRIPTION OF THE INVENTION

Figure 1A:
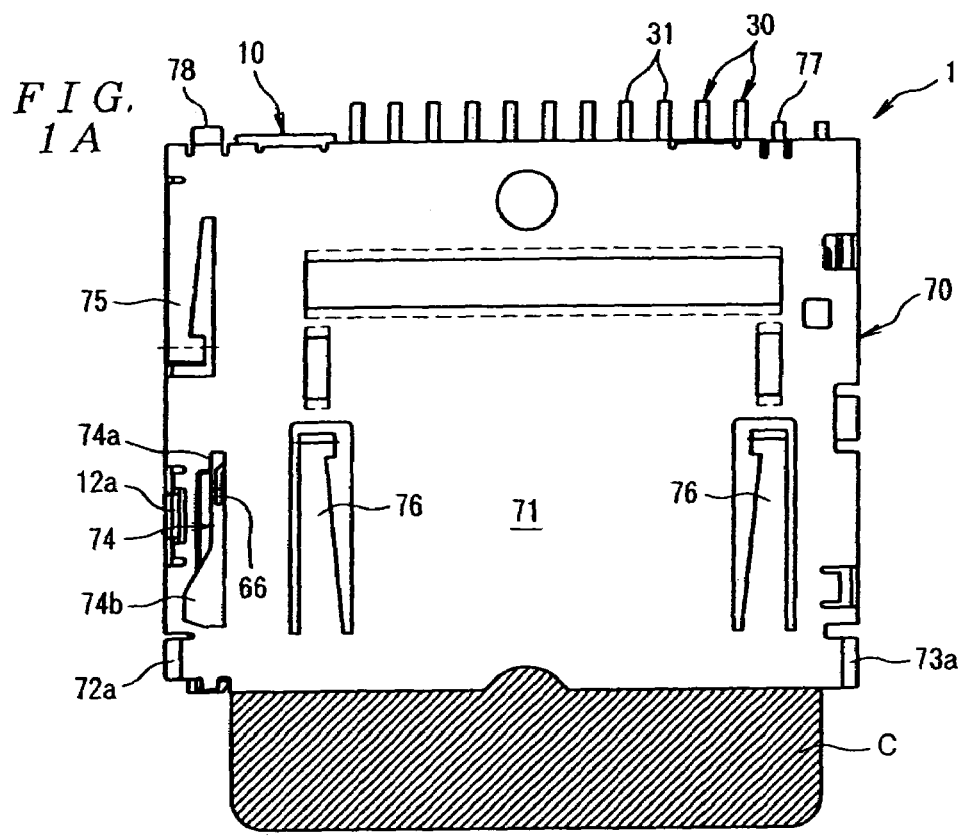
FIG. 1A is a plan view of a card connector according to the invention showing a state in which a card is completely inserted into the card connector.

FIGS. 1A–5B show a card connector 1 according to the invention. The card connector 1 comprises a housing 10 that receives a card C. The housing 10 includes a slider 40 that ejects the card C, a cam mechanism 50, and a locking member 60 that locks the card C. A shell 70 covers an upper surface of the housing 10. In the illustrated embodiment, the housing 10 is devised so that the card C is inserted from a front (lower portion in FIG. 1A) of the housing 10 toward a rear (upper portion in FIG. 1A) of the housing 10, and so that the card C is ejected from the rear of the housing 10 toward the front of the housing 10.

Figure 6A:
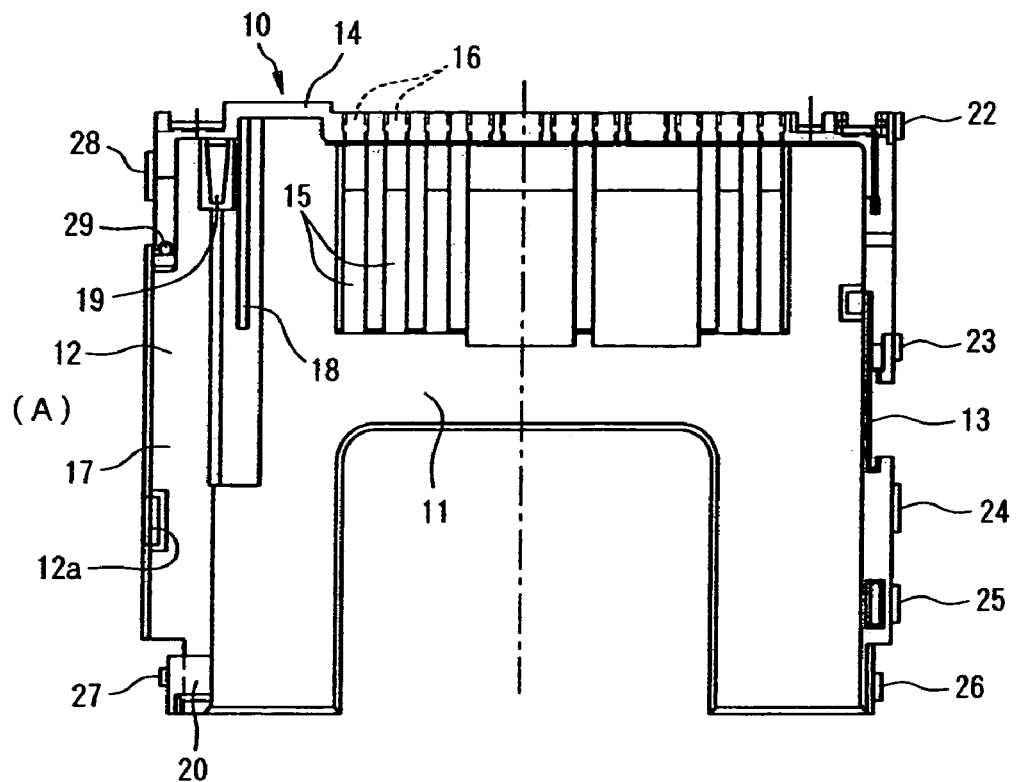
FIG. 6A is a plan view of a housing.
Figure 6B:
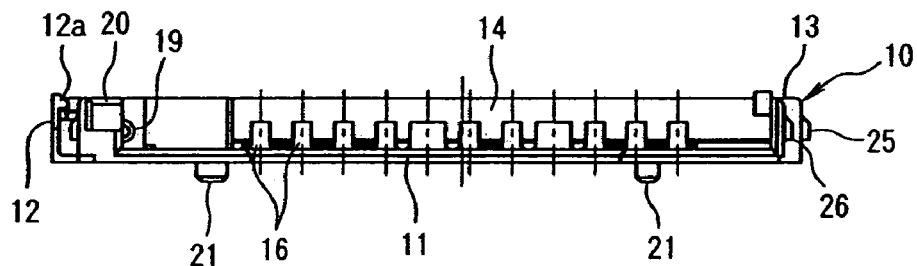
FIG. 6B is a front view of the housing.
Figure 6C:
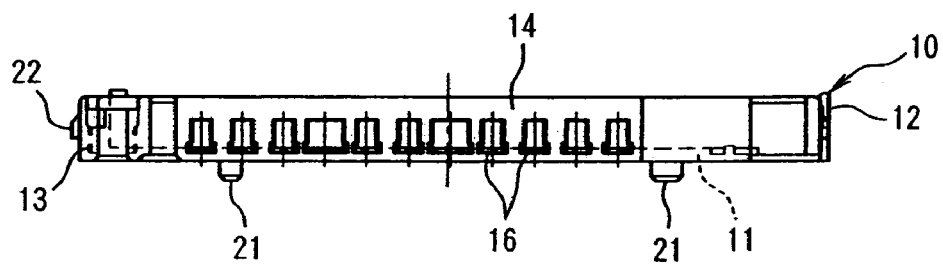
FIG. 6C is a back view of the housing.
Figure 7A:
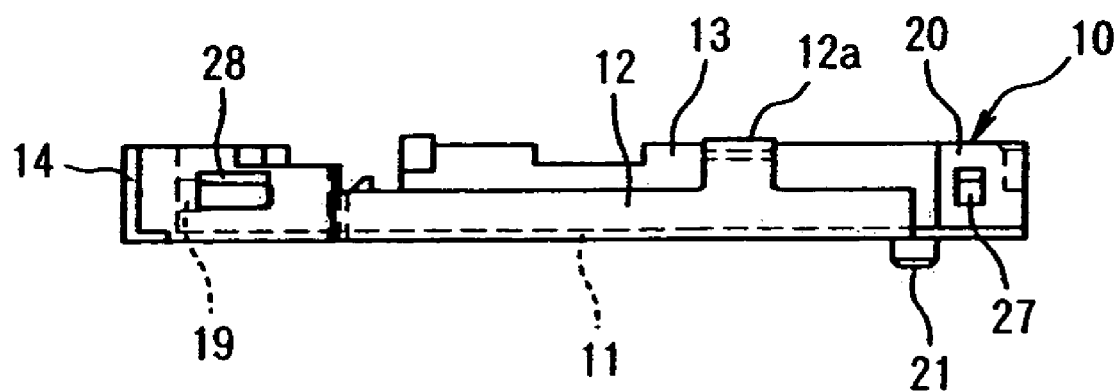
FIG. 7A is a left side view of the housing.
Figure 7B:
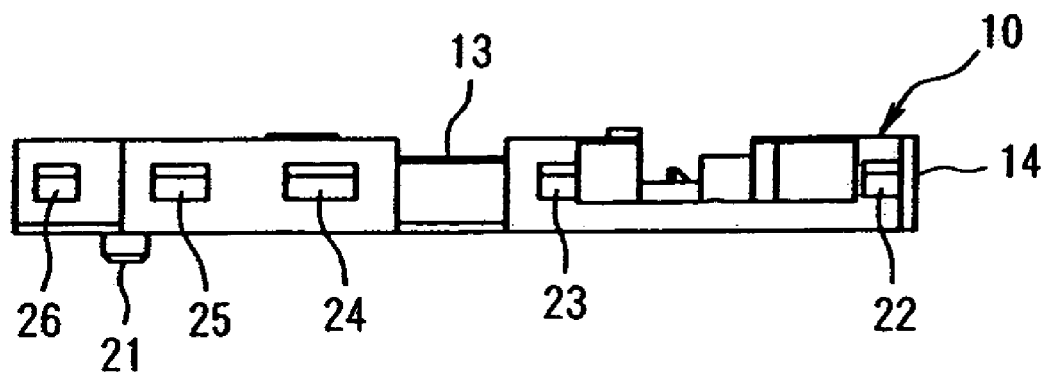
FIG. 7B is a right side view of the housing.

FIGS. 6A–6C show the housing 10. The housing 10 may be formed by molding an insulating resin. The housing 10 comprises a substantially rectangular bottom plate 11. Left and right side walls 12, 13 and a rear wall 14 extend from edges of the bottom plate 11. A plurality of contact receiving grooves 16 are formed in the rear wall 14 of the housing 10. A plurality of flex permitting spaces 15 corresponding to the contact receiving grooves 16 are formed in the bottom plate 11. A slider accommodating space 17 is formed on an inside of the left side wall 12 of the housing 10. A guide groove 18 is formed at a rear portion of the bottom plate 11 and extends forward from the rear wall 14 in a position corresponding to the slider accommodating space 17. A housing spring post 19 protrudes forward from the rear wall 14 slightly to the left of the guide groove 18. A stopper wall 20 protrudes upward from a front portion of the bottom plate 11 in a position corresponding to the slider accommodating space 17. A cam rod shaft-supporting opening 29 is formed in the bottom wall 11 of the housing 10 toward a rear of the slider accommodating space 17 and immediately to the inside of the left side wall 12. First locking claws 22, 23, 24, 25, 26 are formed on an outer surface of the right side wall 13. The first locking claws 22, 23, 24, 25, 26 are arranged at specified intervals along the right side wall 13. A second locking claw 27 extends from an outer surface of the stopper wall 20. A third locking claw 28 extends from a rear end portion of an outer surface of the left side wall 12. A latch claw 12a is formed on an upper end portion of the left side wall 12 and extends in a forward-rearward direction. A plurality of positioning posts 21 for positioning the housing 10 with respect to a circuit board (not shown) are formed on a bottom surface of the housing 10.

Figure 1B:
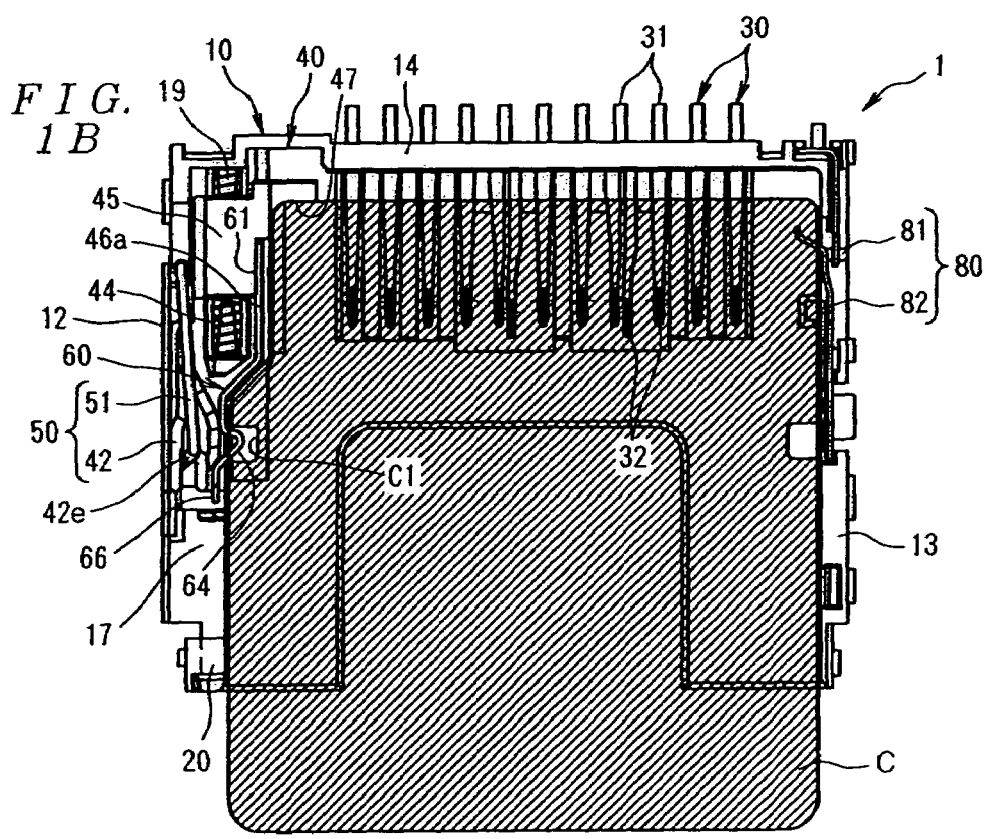
FIG. 1B is a plan view of the card connector of FIG. 1A with a shell of the card connector removed.

Contacts 30 are press-fitted into the contact receiving grooves 16 of the housing 10, as shown in FIGS. 1A–1B. Each of the contacts 30 comprises a board connecting member 31 that extends from the rear wall 14 of the housing 10 that is connected by soldering to a surface of a circuit board (not shown). An elastic contact piece 32 extends forward at an inclination from the rear wall 14 and makes elastic contact with a conductive member (not shown) on a bottom surface of the card C. The elastic contact pieces flex 32 downward into the flex permitting spaces 15 of the bottom plate 11. The contacts 30 may be formed, for example, by stamping and forming a metal plate.

As shown in FIGS. 1A–3B, a card detecting switch 80 is provided on the right side wall 13 of the housing 10. The card detecting switch 80 detects the location of the card C during insertion into the housing 10. The card detecting switch 80 includes a first contact 81 and a second contact 82. The first contact 81 has one end connected to the circuit board (not shown). The second contact 82 has one end connected to the circuit board (not shown) and another end that is pushed into contact with the first contact 81 by the card C when the card C is completely inserted into the housing 10. FIGS. 1A–2B show the first and second contacts 81, 82 prior to being pushed by the card C.

FIGS. 8A–8F show a slider 40. The slider 40 may be formed, for example, by molding an insulating resin. The slider 40 comprises a flat plate-form base 41. A cam groove 42 is formed in an upper surface of the base 41. The cam groove 42 comprises a first cam member 42a formed toward a rear portion of the base 41 that extends in the forward-rearward direction. A second cam member 42b extends diagonally from a front end of the first cam member 42a. A third cam member 42c extends forward from a front end of the second cam member 42b substantially parallel to the first cam member 42a. A front end of the third cam member 42c is bent slightly to the left. A fourth cam member 42d extends forward from the front end of the third cam member 42c substantially parallel to the first cam member 42a. A fifth cam member 42e extends forward at an inclination toward the left from a rear end of the fourth cam member 42d. A sixth cam member 42f extends from a tip end of the fifth cam member 42e and extends in the forward-rearward direction substantially parallel to the first cam member 42a. A rear end of the sixth cam member 42f is bent slightly to the right. A seventh cam member 42g extends rearward from the rear end of the sixth cam member 42f substantially parallel to the first cam member 42a. A rear end of the seventh cam member 42g communicates with the first cam member 42a, so that the cam groove 42 forms a substantially heart-shaped loop.

Figure 8A:
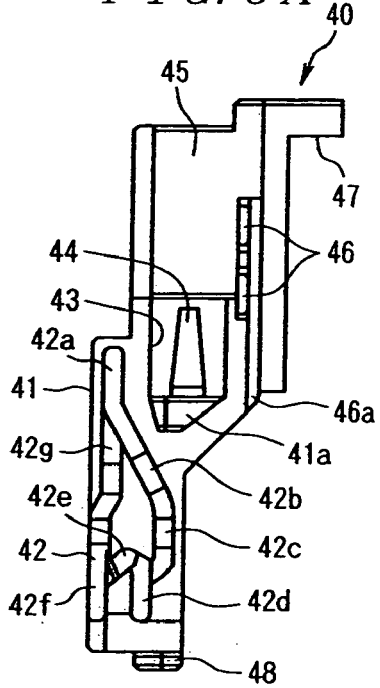
FIG. 8A is a plan view of a slider.
Figure 8B:
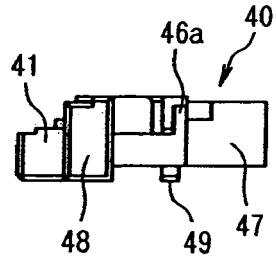
FIG. 8B is a front view of the slider.
Figure 8C:
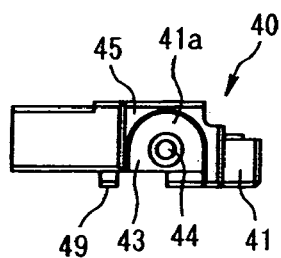
FIG. 8C is a back view of the slider.
Figure 8D:
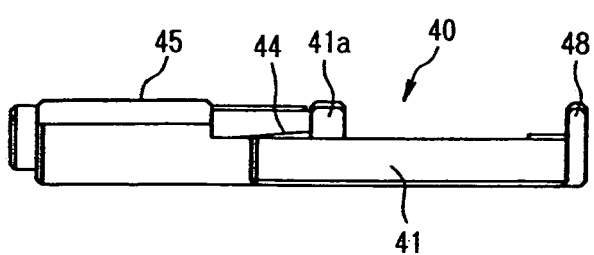
FIG. 8D is a left side view of the slider.
Figure 8E:
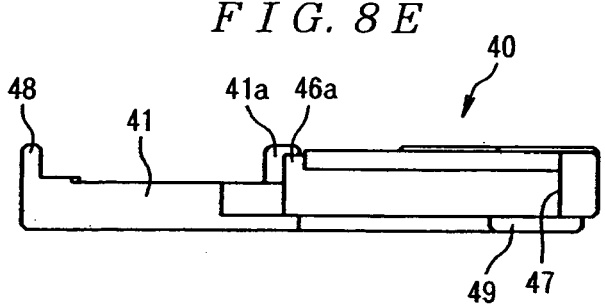
FIG. 8E is a right side view of the slider.
Figure 8F:
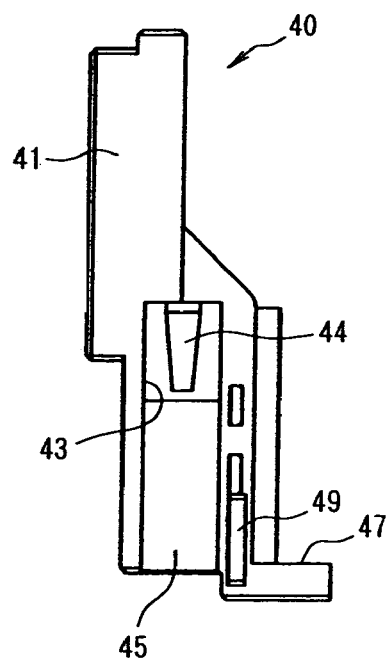
FIG. 8F is a bottom view of the slider.

The second cam member 42b includes a projection 41a. A through-aperture 43 is formed at a rear of the projection 41a and opens rearward and downward. A slider spring post 44 extends rearward from a wall of the base 41 and protrudes into the through-aperture 43. A spring cover 45 is formed above the through-aperture 43 toward a rear of the slider spring post 44, so that the spring cover 45 straddles the through-aperture 43. A plurality of locking member press-fitted grooves 46 are formed in a forward-rearward direction in an upper surface of the base 41 adjacent to the through-aperture 43. A wall member 46a extends from the upper surface of the base 41 in the forward-rearward direction adjacent to the locking member press-fitted grooves 46. A protruding member that has a front face with a pressing surface 47 is formed on the rear of the base 41 and extends to the right. A stopper 48 extends upward from a front surface of the base 41. As shown in FIG. 8F, a guide projection 49 extends downward from a bottom surface of the slider 40 adjacent to the pressing surface 47.

Figure 2A:
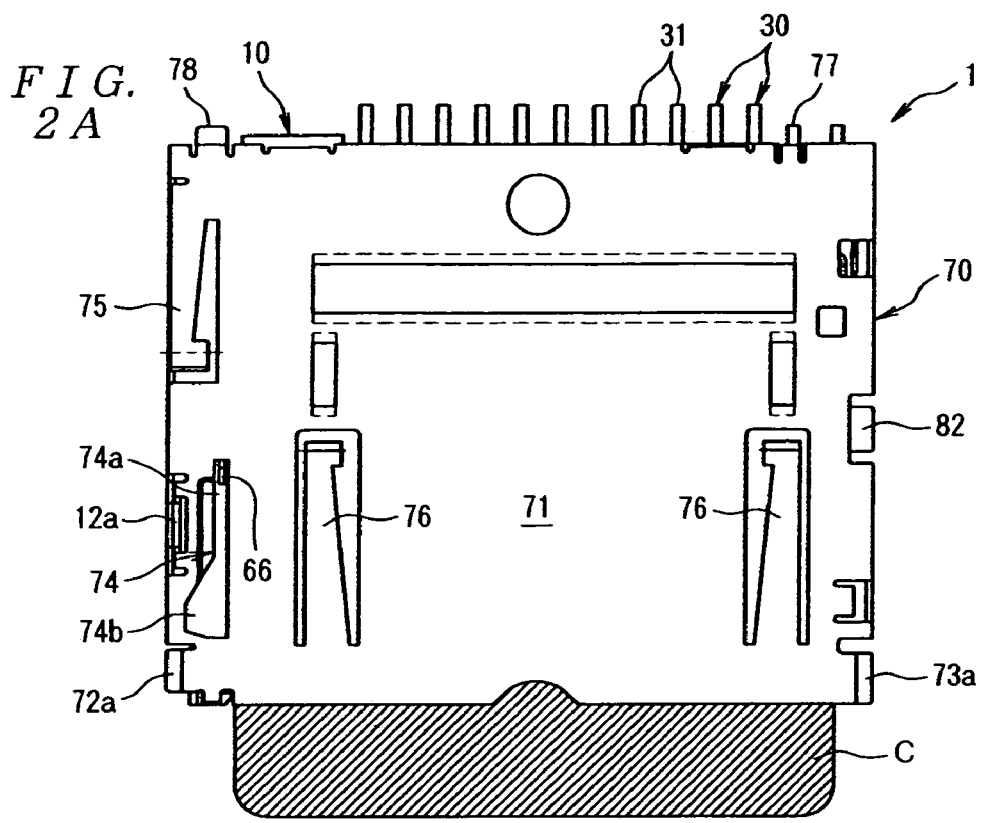
FIG. 2A is a plan view of the card connector showing a state in which the card is inserted into a rearmost-end position from the state shown in FIGS. 1A and 1B.
Figure 2B:
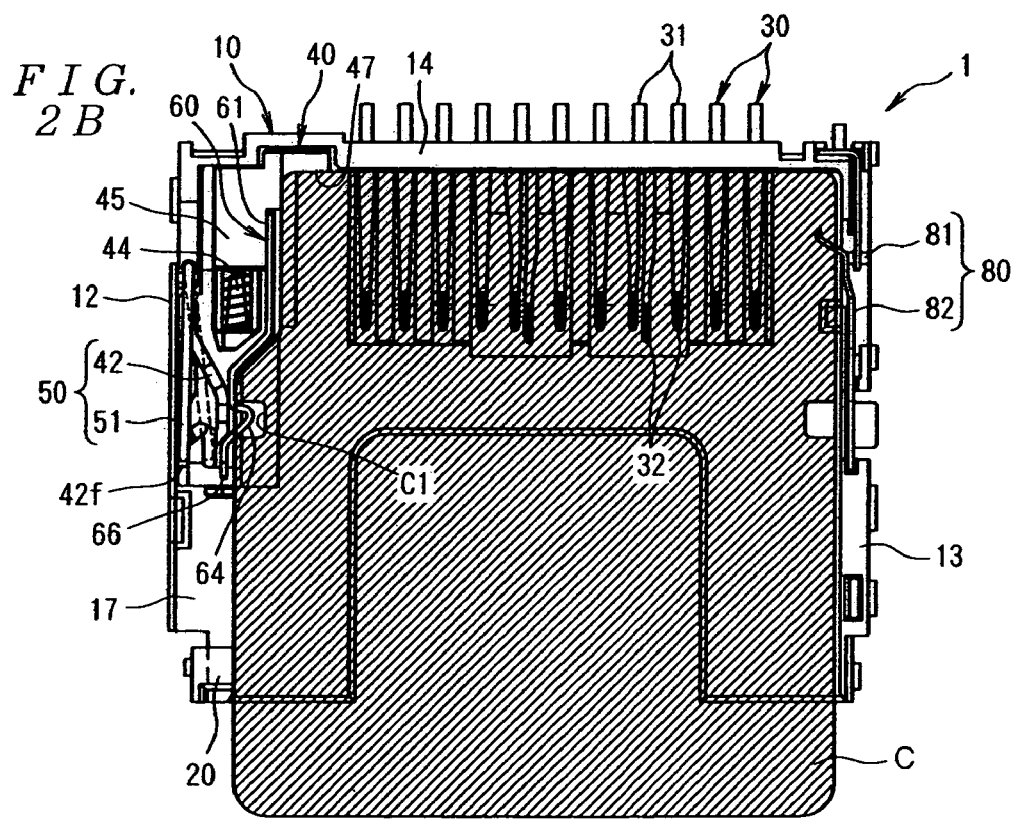
FIG. 2B is a plan view of the card connector of FIG. 2A with a shell of the card connector removed.
Figure 3A:
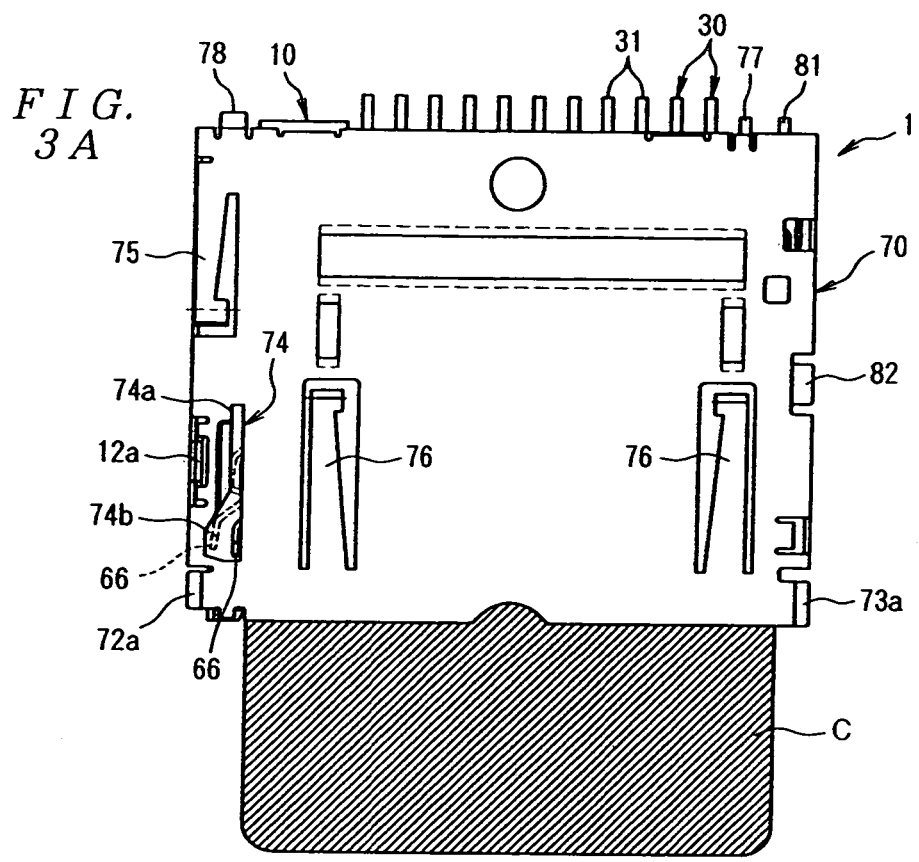
FIG. 3A is a plan view of the card connector showing a state in which the card is ejected from the state shown in FIGS. 2A and 2B.
Figure 3B:
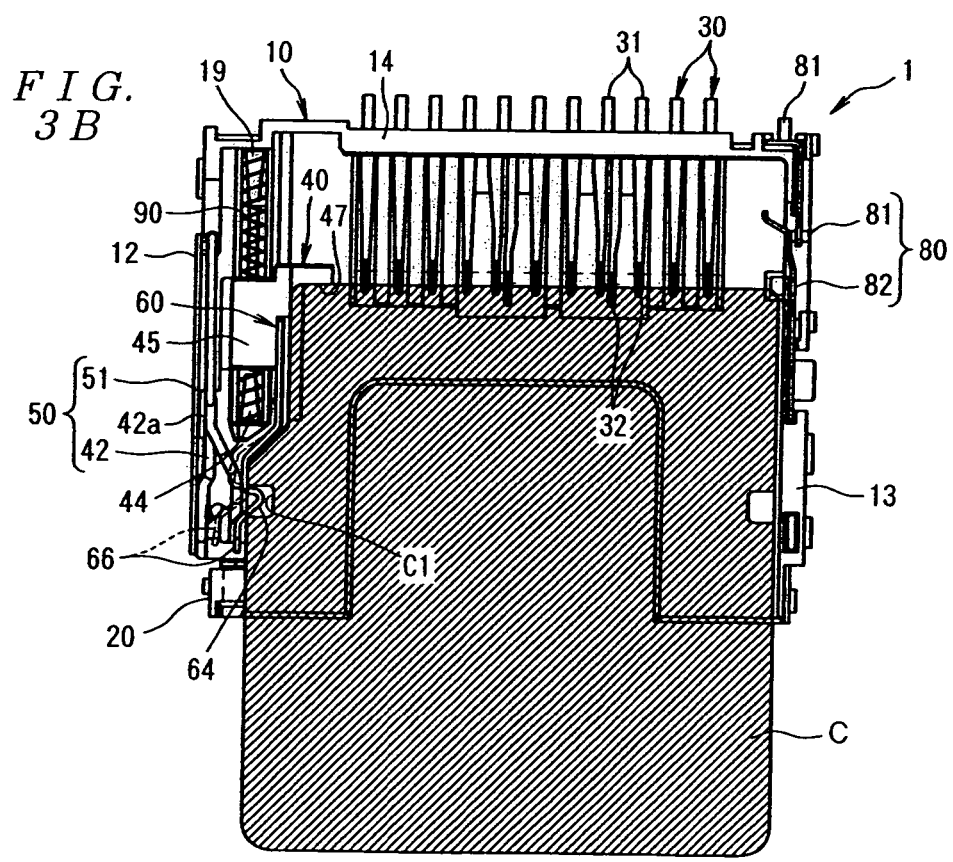
FIG. 3B is a plan view of the card connector of FIG. 3A with a shell of the card connector removed.
Figure 4A:
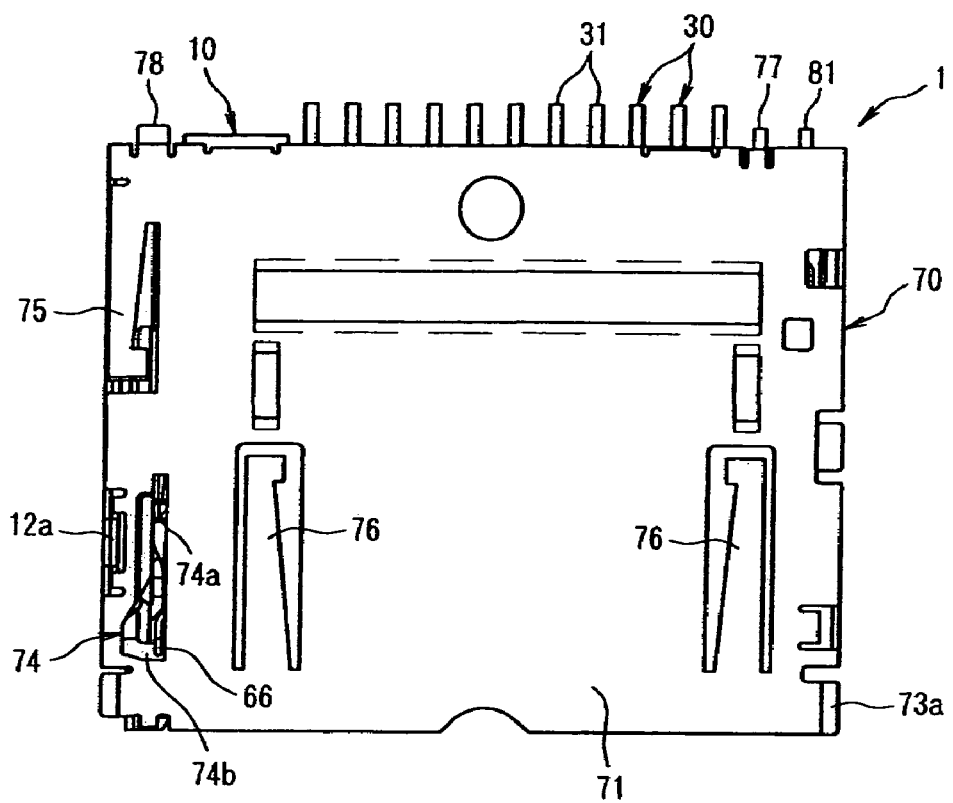
FIG. 4A is a plan view of the card connector.
Figure 4B:
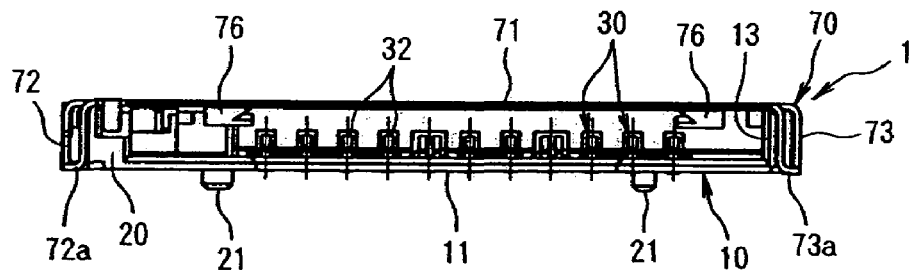
FIG. 4B is a front view of the card connector.
Figure 4C:
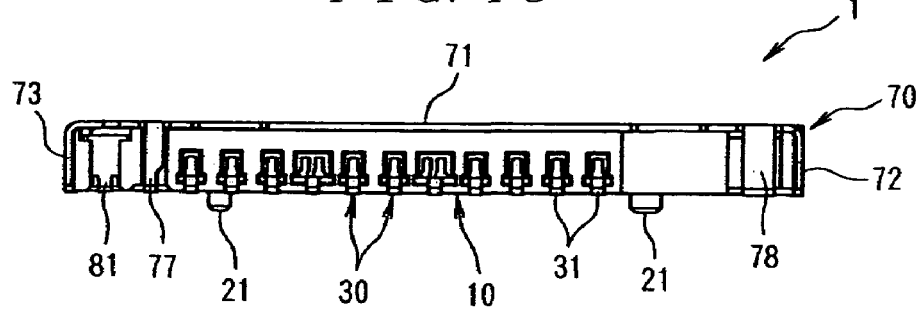
FIG. 4C is a rear view of the card connector.
Figure 5A:
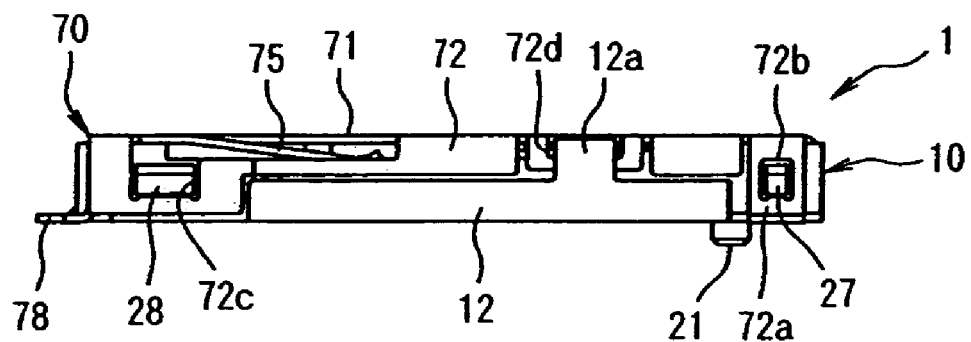
FIG. 5A is a left side view of the card connector.
Figure 5B:
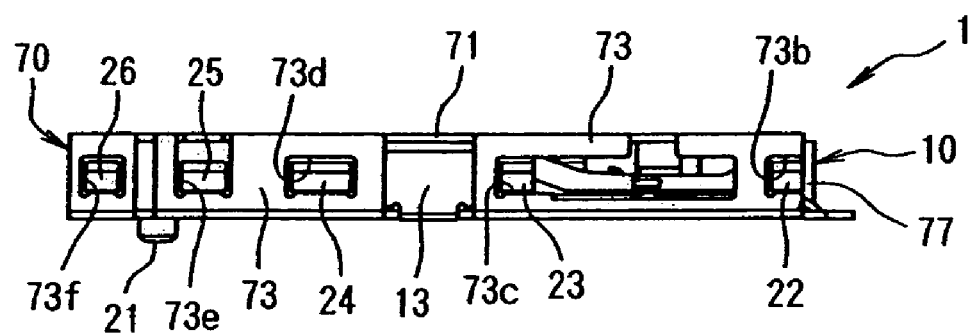
FIG. 5B is a right side view of the card connector.

As shown in FIGS. 1B, 2B and 3B, the slider 40 is accommodated in the slider accommodating space 17 in the housing 10 with the bottom surface of the slider 40 facing downward, and the guide projection 49 inserted into the guide groove 18 formed in the bottom plate 11 of the housing 10. As a result, the slider 40 is disposed in the housing 10 so that the slider 40 can move in the forward-rearward direction as the guide projection 49 is guided by the guide groove 18. As shown in FIG. 3B, a spring 90, such as a compression coil spring, is installed between the rear end of the slider 40 and the rear wall 14 of the housing 10, so that the slider 40 is constantly driven in a direction of card ejection (forward direction) by the spring 90. A rear end of the spring 90 is fitted over the housing spring post 19, and a front end of the spring 90 is fitted over the slider spring post 44. The cam groove 42 and the locking member 60 are disposed in a lateral direction, and the spring 90 is disposed in the area between the rear wall 14 of the housing 10, the cam groove 42, and the locking member 60. The slider 40 can move along the direction of ejection of the card C between a first position shown in FIG. 1B wherein the insertion of the card C is completed, a second position shown in FIG. 2B where the card C is pushed toward the rearmost end of the housing 10, and a third or final position shown in FIG. 3B where the card C is ejected.

Figure 9:
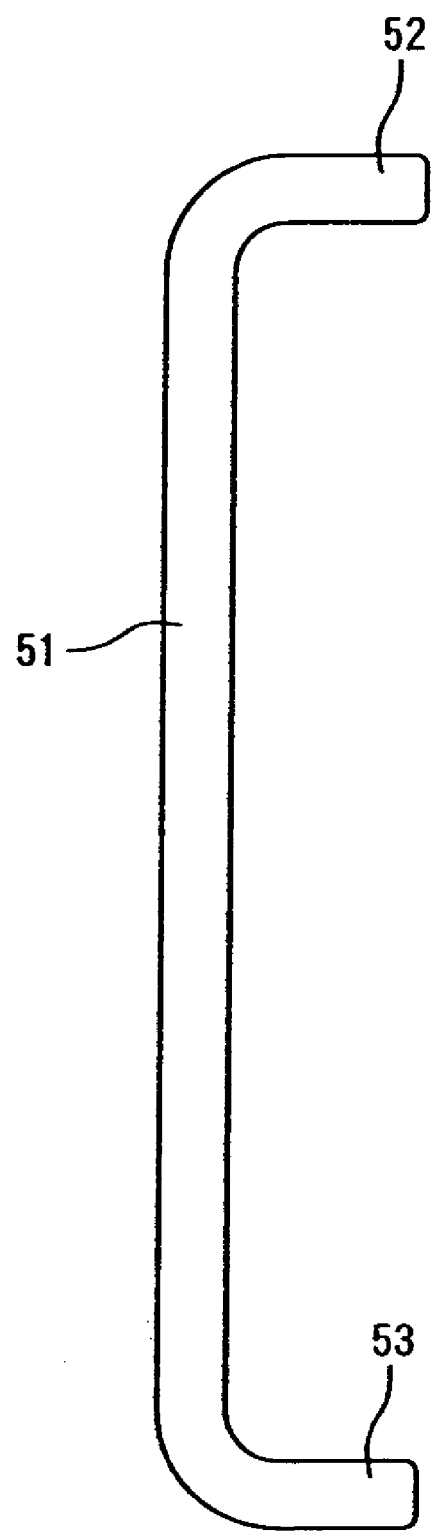
FIG. 9 is a right-side view of a cam rod.

The cam mechanism 50 is used to cause the slider 40 to stop in the first position and the third position. The cam mechanism 50 includes the cam groove 42 and a cam rod 51. As shown in FIG. 9, the cam rod 51 is formed by bending both ends of a metal rod in the same direction to form a support shaft 52 and a cam engagement member 53. The support shaft 52 is supported by the cam rod shaft-supporting aperture 29 in the housing 10 and the cam engagement member 53 is received in the cam groove 42.

Figure 10A:
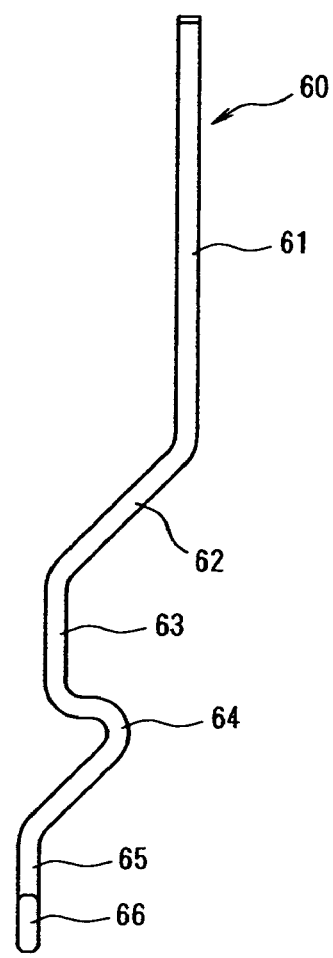
FIG. 10A is a plan view of a locking member.
Figure 10B:
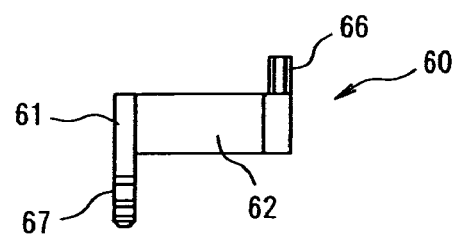
FIG. 10B is a back view of the locking member.
Figure 10C:
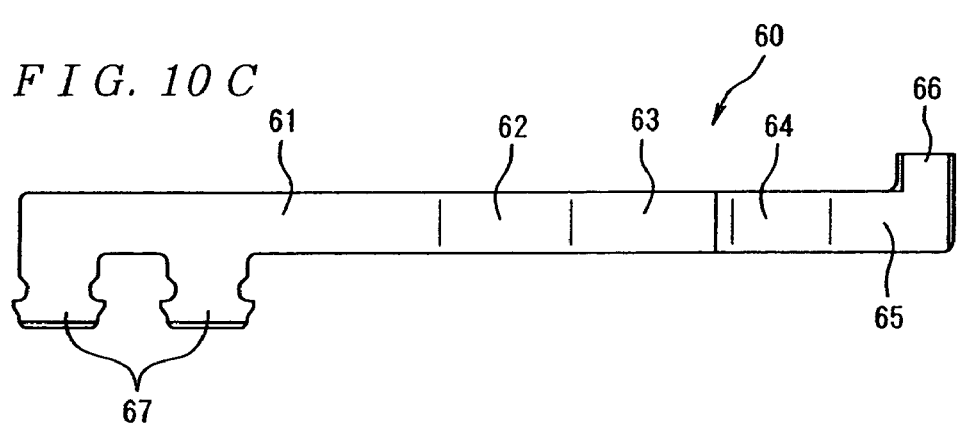
FIG. 10C is a left side view of the locking member.
Figure 11A:
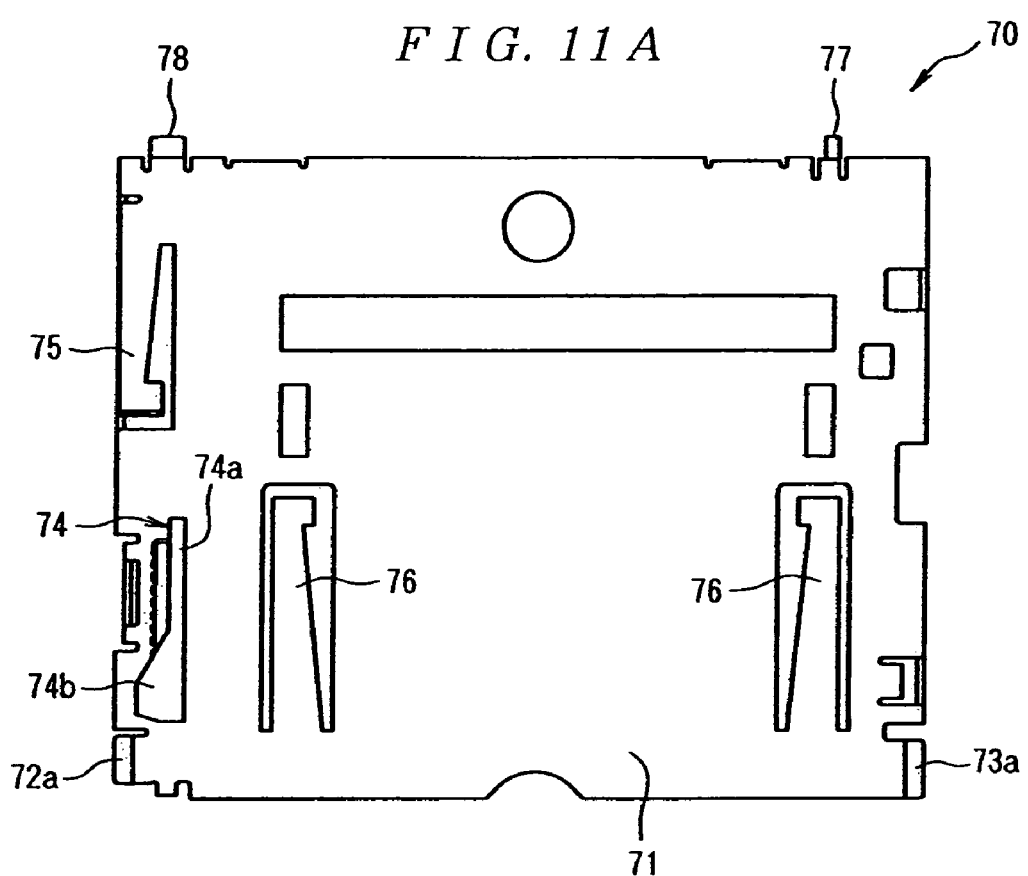
FIG. 11A is a plan view of a shell.
Figure 11B:
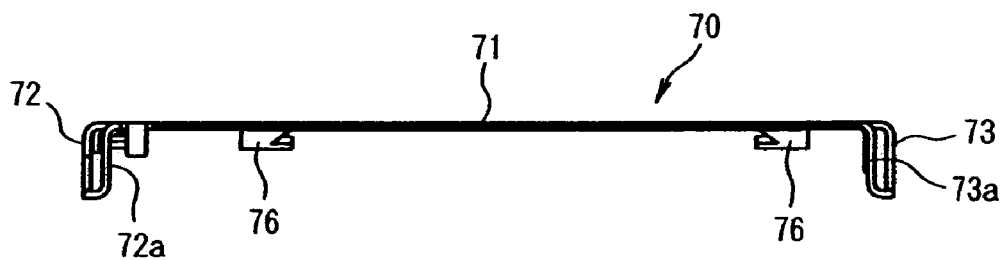
FIG. 11B is a front view of the shell.
Figure 11C:
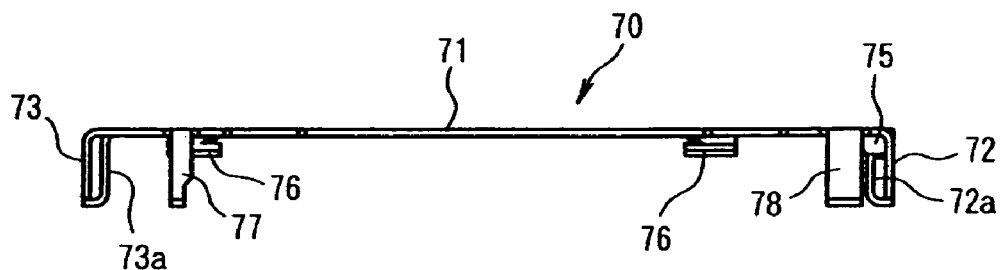
FIG. 11C is a back view of the shell.
Figure 12A:
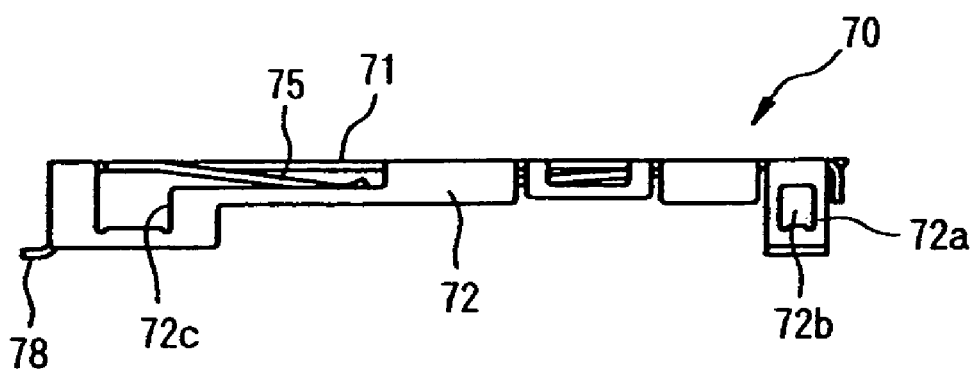
FIG. 12A is a left-side view of the shell.
Figure 12B:
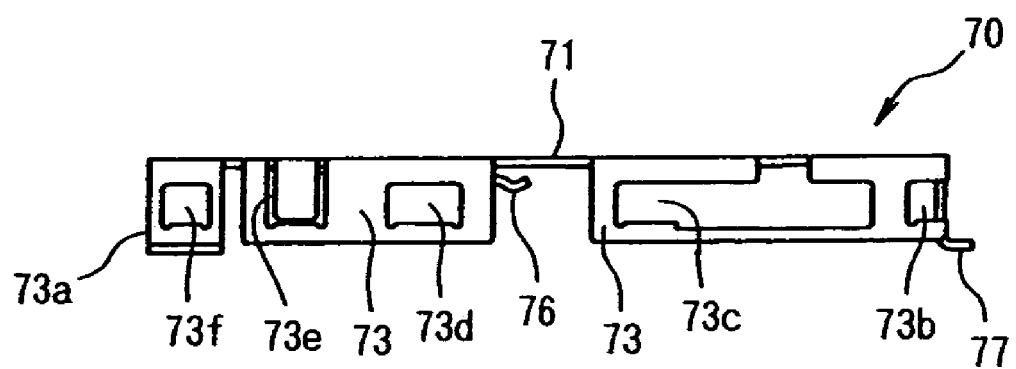
FIG. 12B is a right-side view of the shell.
Figure 13:
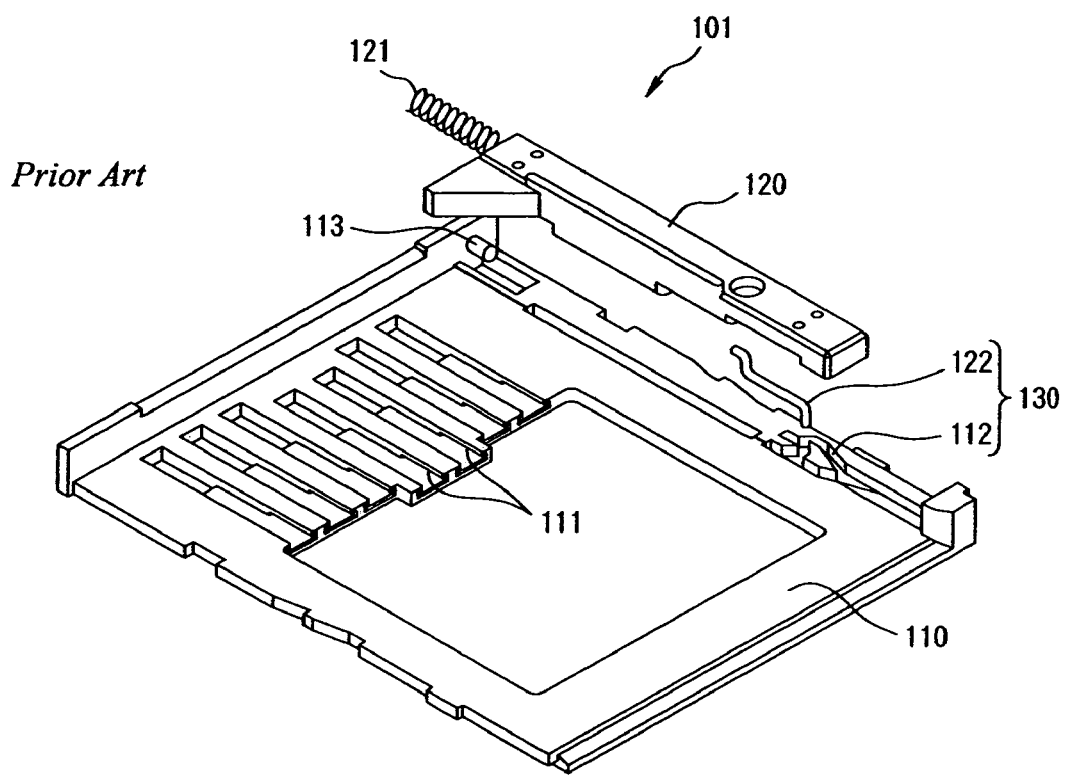
FIG. 13 is an exploded perspective view of a conventional card connector.
Figure 14A:
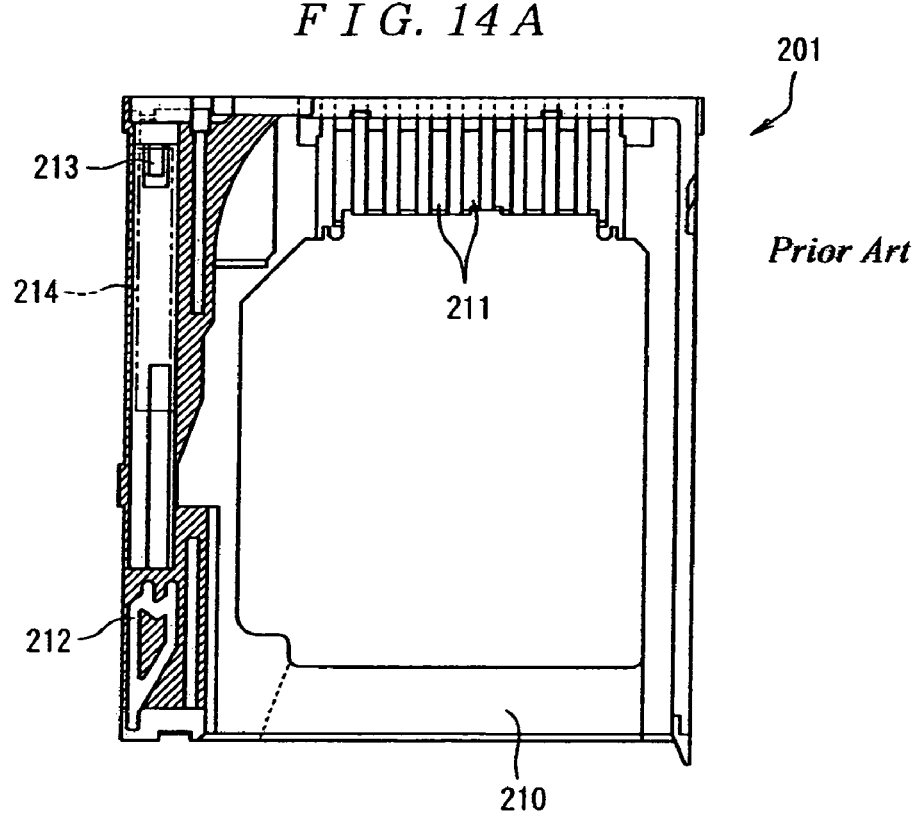
FIG. 14A is a plan view of a housing of another conventional card connector.
Figure 14B:
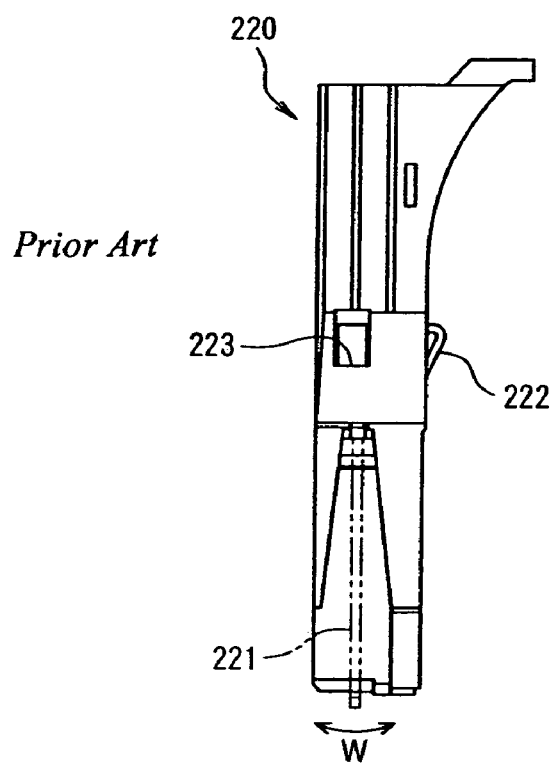
FIG. 14B is a plan view of a slider of the conventional card connector of FIG. 14A.

FIGS. 10A–10C show the locking member 60. The locking member 60 may be formed, for example, by stamping and forming a metal plate. The locking member 60 comprises a fixed end 61. Press-fitting members 67 extend downward from a lower edge of the fixed end 61. A first portion 62 extends forward at an inclination toward the left from a front end of the fixed end 61. A second portion 63 extends forward from a front end of the first portion 62 substantially parallel to the fixed end 61. A bent portion 64 extends rightward from a front end of the second portion 63 and is bent to extend forward at an inclination toward the left. A third portion 65 extends forward from a front end of the bent portion 64. A locking projection 66 extends upward from an upper edge of the third portion 65.

The press-fitting members 67 are fastened to the slider 40 such that the locking member 60 is substantially constructed as a cantilever. As shown in FIGS. 1B, 2B and 3B, the bent portion 64 of the locking member 60 is positioned inside a cutout C1 formed in a side of the card C. The locking projection 66 is positioned slightly to the right of the cam groove 42 when the bent portion 64 is positioned inside the cutout C1. The locking projection 66 is positioned above the cam groove 42, as indicated by the broken line in FIG. 3B, when the bent portion 64 contacts a side edge of the card C. The range of mobility of the locking projection 66 overlaps above the cam groove 42. When the press-fitting members 67 are fastened to the slider 40, the fixed end 61 of the locking member 60 contacts the left-side surface of the wall 46a of the slider 40, as shown in FIGS. 1B, 2B and 3B, so that rightward displacement is restricted by the wall 46a.

FIGS. 11A–12B show the shell 70. The shell 70 may be formed, for example, by stamping and forming a metal plate. The shell 70 comprises a substantially rectangular flat plate member 71. Left and right side walls 72, 73 extend downward from sides of the flat plate member 71. A second left side wall 72a extends downward from the flat plate member 71 and is formed by bending a front end of the flat plate member 71 on a side of the left side wall 72. A second locking aperture 72b is formed in the second left side wall 72a and engages the second locking claw 27. A third locking aperture 72c is formed in the left side wall 72 and engages the third locking claw 28. A cutout is formed in a substantial center of the right side wall 73. First locking apertures 73b, 73c, 73d 73e are formed in the right side wall 73 and engage the first locking claws 22, 23, 24, 25, respectively. A second right side wall 73a extends downward from the flat plate member 71 and is formed by bending a front end of the flat plate member 71 on a side of the right side wall 73. A fourth locking aperture 73f is formed in the second right side wall 73a and engages the first locking claw 26 formed on the right side wall 13 of the housing 10.

A pair of tongue members 76 extends downward from the flat plate member 71 and presses the card C downward to prevent the card C from falling out of the housing 10 when the card C is ejected. A spring piece 75 extends downward from the flat plate member 71 and presses the cam rod 51 downward to secure the cam rod in position. The flat plate member 71 includes an engaging member 74 formed from a substantially narrow opening 74a. The engaging member 74 engages with the projection 66 and has a wide opening 74b that extends forward from a front end of the narrow opening 74a. The width of the wide opening 74b gradually increases to ultimately have a width that is approximately twice the width of the narrow opening 74a or greater. In the first position shown in FIG. 1B and in the second position shown in FIG. 2B, the engaging member 74 restricts the movement of the free end of the locking member 60 as a result of the projection 66 being engaged with the narrow opening 74a. When the slider 40 is in the third position shown in FIG. 3B, the engaging member 74 permits the free end of the locking member 60 to move as a result of the projection 66 of the locking member 60 being positioned inside the wide opening 74b.

The operation of the card connector 1 according to the invention will now be described with reference to FIGS.

1A–3B. Before the card C is inserted into the housing 10, the slider 40 is in the third position shown in FIG. 3B, because the slider 40 is driven in the direction of card ejection by the spring 90. In this position, the cam engagement member 53 of the cam rod 51 is positioned in the rear-end portion of the first cam member 42a of the cam groove 42. The projection 66 of the locking member 60 is positioned slightly to the inside of the cam groove 42 and inside the wide opening 74b of the shell 70, so that the free end of the locking member 60 is free to move. Thus, there is no interference between the cam rod 51 and the locking member 60 because the cam rod 51 and the locking member 60 are positionally separated.

In this position, the card C is inserted into the front of the housing 10, as shown in FIGS. 1A–1B. The inner surface of the right side wall 13 and the inner wall surface of the stopper wall 20 guide the card C, as the card C is being inserted into the housing 10. As the card C is inserted into the housing 10, the left-side edge of the card C causes the bent member 64 of the locking member 60 to be displaced outward. When the bent member 64 is displaced outward, the projection 66 of the locking member 60 is positioned above the second, third, fourth, and fifth cam members 42b, 42c, 42d, 42e of the cam groove 42. The cam engagement member 53 of the cam rod 51 is positioned in the rear-end portion of the first cam member 42a of the cam groove 42. The cam rod 51 and the locking member 60 are therefore positionally separated, so that there is no interference.

When the cutout C1 in the card C reaches the position of the bent member 64, the bent member 64 is displaced inward and is positioned inside the cutout C1. In this position, the projection 66 of the locking member 60 is positioned inside the wide opening 74b of the shell 70, and the free end of the locking member 60 is free to move. The end of the card C contacts the pressing surface 47 of the slider 40 about the same time the bent member 64 is received in the cutout C1. In this position, the projection 66 of the locking member 60 is located slightly on the inside of the cam groove 42, and the cam engagement member 53 of the cam rod 51 is positioned in the rear-end portion of the first cam member 42a of the cam groove 42. Since the cam rod 51 and the locking member 60 are positionally separated, there is no interference.

The card C is inserted until the slider 40 and the end of the card C contact the rear wall 14 of the housing 10. In this position, the cam engagement member 53 of the cam rod 51 is positioned in the front-end portion of the fourth cam member 42d of the cam groove 42 from the first cam member 42a via the second cam member 42b and third cam member 42c. The projection 66 of the locking member 60 is positioned inside the narrow opening 74a in the shell 70 and engages with the edge portion of the narrow opening 74a, so that movement of the free end of the locking member 60 is restricted. Accordingly, there is no interference between the cam rod 51 and the locking member 60.

When the card C is released, the slider 40 is driven in the direction of card ejection by the spring 90. The card C moves in the direction of card ejection together with the slider 40 until the card reaches the first position shown in FIG. 1B. At this point, the insertion of the card C is completed, and the elastic contact pieces 32 of the contacts 30 contact the conductive member formed on the bottom surface of the card C, so that the circuit board (not shown) and the card C are electrically connected. Additionally, the first and second contacts 81, 82 of the card detecting switch 80 contact each other, so that an insertion detection signal is sent to the circuit board (not shown). During this process, the cam engagement member 53 of the cam rod 51 moves from the fourth cam member 42d to the fifth cam member 42e of the cam groove 42 and stops at the rear end of the fifth cam member 42e. The projection 66 of the locking member 60 is still positioned inside the narrow opening 74a in the shell 70, and the movement of the free end of the locking member 60 is restricted by the engagement of the projection 66 with the edge portion of the narrow opening 74a. The bent member 64 of the locking member 60 is positioned inside the cutout C1 in the card C. Accordingly, there is no interference between the cam rod 51 and the locking member 60. Furthermore, since the movement of the free end of the locking member 60 is restricted in the first position, it is possible to prevent the card C from being forcibly pulled out of the housing 10.

When the card is to be ejected, the card C is pushed toward the rear wall of the housing 10 until the slider 40 and the end of the card C contact the rear wall 14 of the housing 10, as shown in FIG. 2B. During this process, the cam engagement member 53 of the cam rod 51 is moved from the fifth cam member 42e to the front-end portion of the sixth cam member 42f. In this position, the projection 66 of the locking member 60 is still positioned inside the narrow opening 74a in the shell 70, and the movement of the free end of the locking member 60 is restricted by the engagement of the projection 66 with the edge portion of the narrow opening 74a. The bent member 64 of the locking member 60 is positioned inside the cutout C1 in the card C. Accordingly, there is no interference between the cam rod 51 and the locking member 60.

The slider 40 is then driven in the direction of card ejection by the spring 90, and the card C moves in the direction of card ejection together with the slider 40 until the slider 40 is placed in the third position shown in FIG. 3B. In this position, the state of contact between the conductive member of the card C and the elastic contact pieces 32 of the contacts 30 is released, so that the card C is ejected from the housing 10. During this process, the cam engagement member 53 of the cam rod 51 is moved from the sixth cam member 42f to the rear-end portion of the first cam member 42a via the seventh cam member 42g. The stopper 48 located at the foremost end of the slider 40 contacts the stopper wall 20 of the housing 10, so that the forward movement of the slider 40 is restricted. The projection 66 of the locking member 60 is positioned inside the wide opening 74b in the shell 70, so that movement of the free end of the locking member 60 is permitted. The bent member 64 is positioned inside the cutout C1 of the card C. In this position, the position of the projection 66 of the locking member 60 is located slightly on the inside of the cam groove 42. Since the cam rod 51 and the locking member 60 are positionally separated, there is no interference. Accordingly, in the third position, the elastic force of the locking member 60 acts as a temporary holding mechanism for the card C, so that it is possible to prevent the card C from suddenly ejecting from the housing 10 and being damaged.

Additionally, when the slider 40 is in the third position, if the card C is intentionally pulled out with a strong force, the locking member 60 will flex to allow the card to be released. The cutout C1 and the corner portion that is formed with the left-side edge of the card C causes the bent member 64 of the locking member 60 to be displaced outward, so that the bent member 64 is disengaged from the cutout C1 in the card C. The bent member 64 moves along the left-side edge of the card C, and the projection 66 overlaps above the second, third, fourth, and fifth cam members 42b, 42c, 42d, 42e of the cam groove 42. In this position, the cam engagement member 53 of the cam rod 51 is positioned in the rear-end portion of the first cam member 42a of the cam groove 42, and the cam rod 51 and the locking member 60 are positionally separated, so that there is no interference. When the card C is removed from the housing 10, the projection 66 returns to its original position.

In the embodiment described above, the cam mechanism 50 includes the heart-shaped cam groove 42 formed in the slider 40, and the cam rod 51 that is shaft-supported by the housing 10 and follows the cam groove 42. Since the heart-shaped cam groove 42 is formed in the slider 40, the length of the housing 10 in a direction of depth (direction of card insertion and ejection) is not limited by the position of the cam groove 42, so that the depth dimension of the housing 10 can be reduced. Furthermore, the locking member 60 has a cantilever shape in which the press-fitting members 67 at one end are fastened to the locking member press-fitted grooves 46 in the slider 40, and the mobility range of the free end at the other end overlaps above the cam groove 42, so that the dimension of the slider 40 in the direction of depth can also be reduced. Accordingly, not only are the dimensions of width and height reduced, but also the depth dimension of the card connector 1 is reduced, so that it is possible to obtain a compact card connector 1. Moreover, the cam groove 42 and locking member 60 are disposed in the lateral direction, and the spring 90 is disposed in the area between the rear wall of the housing 10, the cam groove 42 in the slider 40, and the locking member 60. Accordingly, it is possible to further reduce the depth dimension of the card connector 1.

An embodiment of a card connector 1 according to the invention was described above. However, the invention is not limited to the above described embodiment. Various alterations or modifications can be made within the scope and spirit of the invention. For example, the engaging member 74 includes the narrow opening 74a and the wide opening 74b. Alternatively, the engaging member 74 may include a groove that is formed in the shell 70 that restricts movement of the free end of the locking member 60 by the engagement with the projection 66 when the slider 40 is in the first position and allows movement of the free end of the locking member 60 when the slider 40 is in the third position.

I claim:

1. A card connector, comprising:
   a housing that receives a card, the housing having a plurality of contacts;
   a slider arranged in the housing, the slider being moveable between a first position where the card has been inserted into the housing and a final position where the card is ejected from the housing, the slider including a spring that drives the slider in a direction of card ejection;
   a cam mechanism that secures the slider in the first position and the final position, the cam mechanism including a substantially heart-shaped cam groove and a cam rod, the cam rod having a support shaft fixed to the housing and a cam engagement member positioned in the cam groove; and
   a locking member that locks the card in the housing, the locking member being of a substantially cantilever construction and having a fixed end attached to the slider and a free end that is positioned substantially above the cam groove, the free end being moveable across the cam groove.

2. The card connector of claim 1, further comprising a shell provided on an upper surface of the housing, the shell including an engaging member that receives a projection on the free end of the locking member, the engaging member securing the free end when the slider is in the first position.

3. The card connector of claim 2, wherein the engagement member includes a narrow opening and a wide opening, the projection being arranged in the narrow opening when the slider is in the first position, and the projection being arranged in the wide opening when the slider is in the final position.

4. The card connector of claim 1, wherein the cam groove is formed in the slider.

5. The card connector of claim 1, wherein the cam groove and the locking member are disposed in a lateral direction of the slider.

6. The card connector of claim 5, wherein the spring is arranged between an end wall of the housing, the cam groove, and the locking member.

7. The card connector of claim 1, wherein the locking member is formed from a metal plate.

8. The card connector of claim 1, wherein the locking member includes a bent member that engages the card to lock the card in the housing.

9. The card connector of claim 1, wherein the fixed end of the locking member is secured to the slider by press-fitting.

10. The card connector of claim 1, wherein the slider is formed from an insulating resin.

11. A card connector, comprising:
    a housing that receives a card, the housing having a plurality of contacts;
    a slider arranged in the housing, the slider being moveable between a first position where the card has been inserted into the housing and a final position where the card is ejected from the housing, the slider including a substantially heart-shaped cam groove;
    a spring attached to the slider that drives the slider in a direction of card ejection, and
    a locking member that locks the card in the housing, the locking member being of a substantially cantilever construction and having a fixed end attached to the slider and a free end that is positioned substantially above the cam groove, the free end being moveable across the cam groove.

12. The card connector of claim 11, further comprising a shell provided on an upper surface of the housing, the shell including an engaging member that receives a projection on the free end of the locking member, the engaging member securing the free end when the slider is in the first position.

13. The card connector of claim 12, wherein the engagement member includes a narrow opening and a wide opening, the projection being arranged in the narrow opening when the slider is in the first position, and the projection being arranged in the wide opening when the slider is in the final position.

14. The card connector of claim 11, wherein the cam groove and the locking member are disposed in a lateral direction of the slider.

15. The card connector of claim 11, wherein the spring is arranged between an end wall of the housing, the cam groove, and the locking member.

16. The card connector of claim 11, wherein the locking member is formed from a metal plate.

17. The card connector of claim 11, wherein the locking member includes a bent member that engages the card to lock the card in the housing.

18. The card connector of claim 11, wherein the fixed end of the locking member is secured to the slider by press-fitting.

19. The card connector of claim 11, wherein the slider is formed from an insulating resin.

* * * * *